Figure 5:
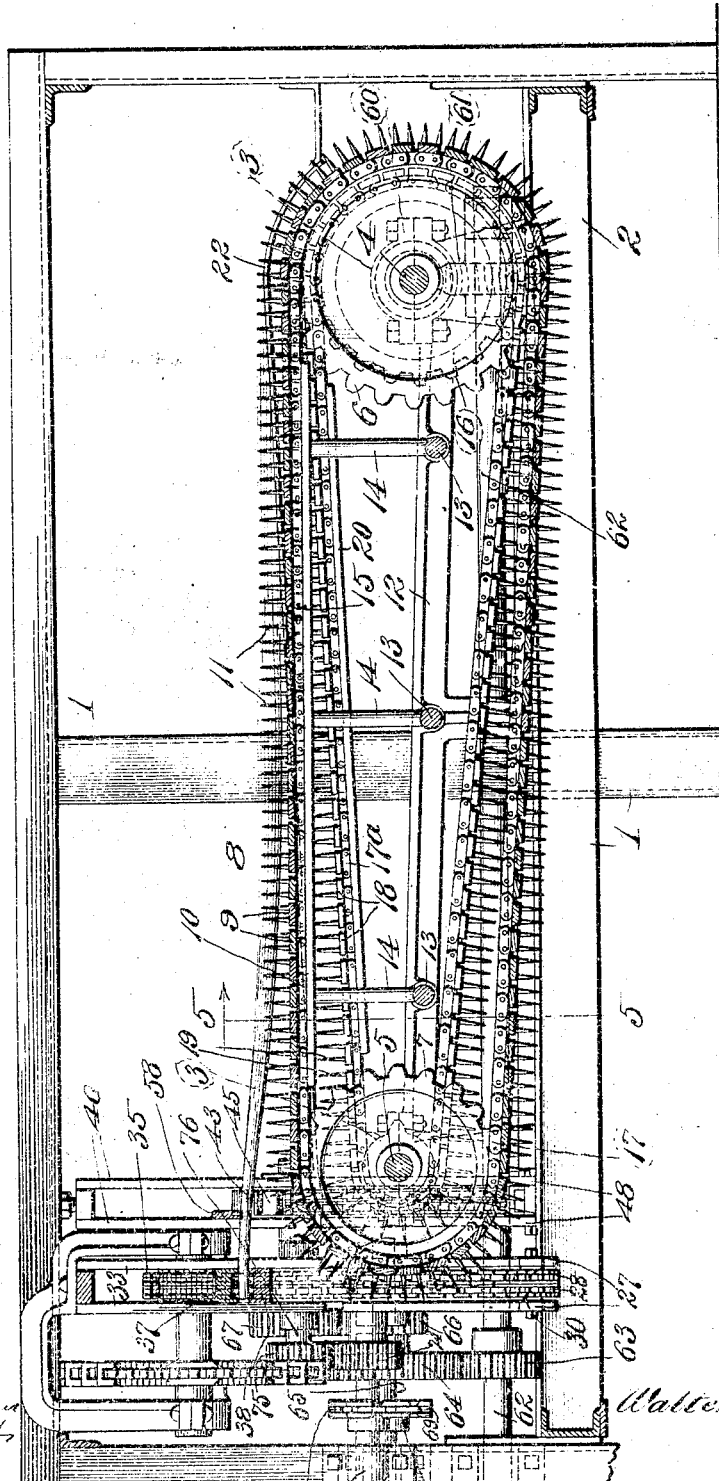

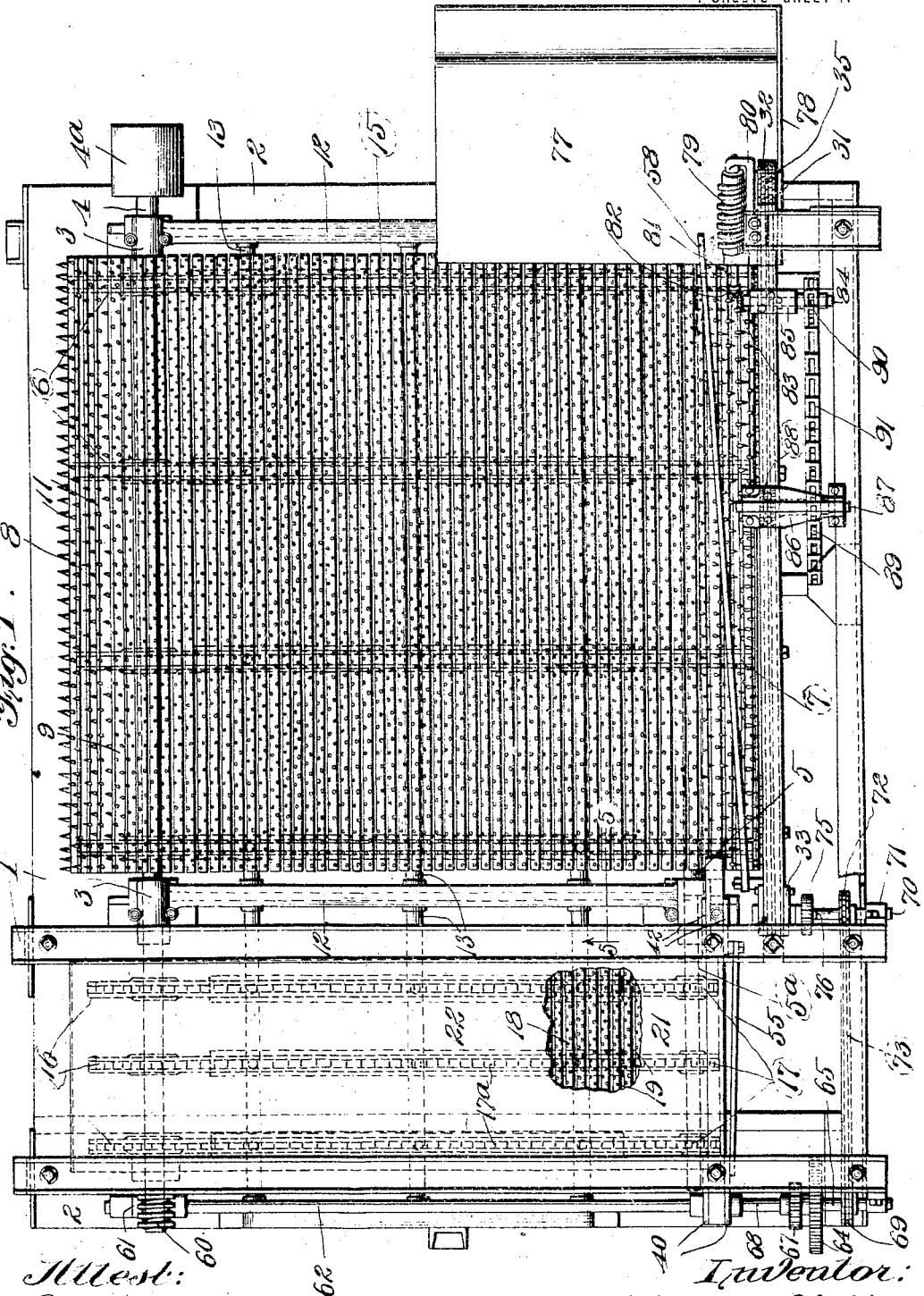

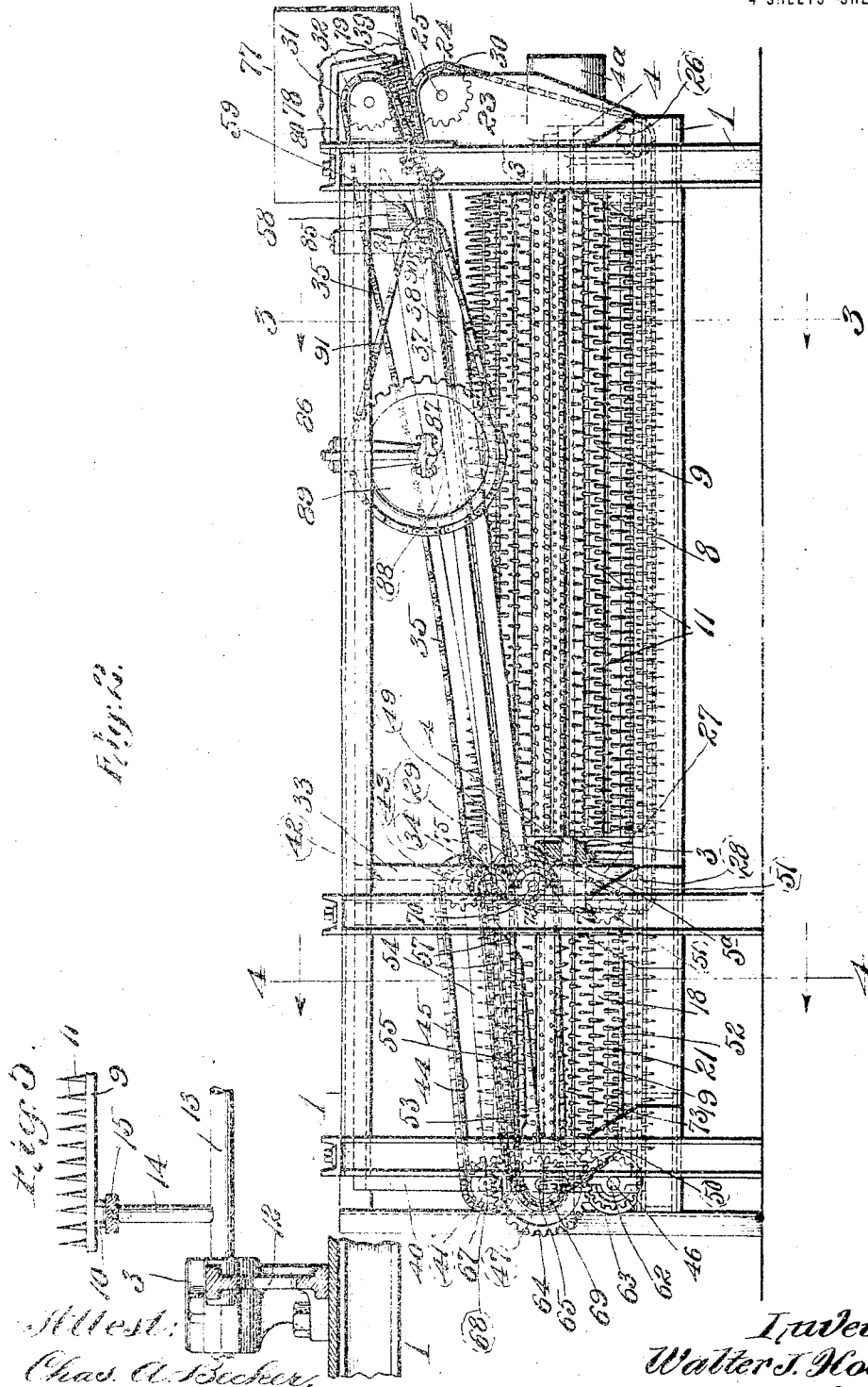

W. J. HOLLIER.
MACHINE FOR DECORTICATING FIBROUS PLANTS.
APPLICATION FILED SEPT. 23, 1912.

1,157,780.  Patented Oct. 26, 1915.
4 SHEETS—SHEET 3.

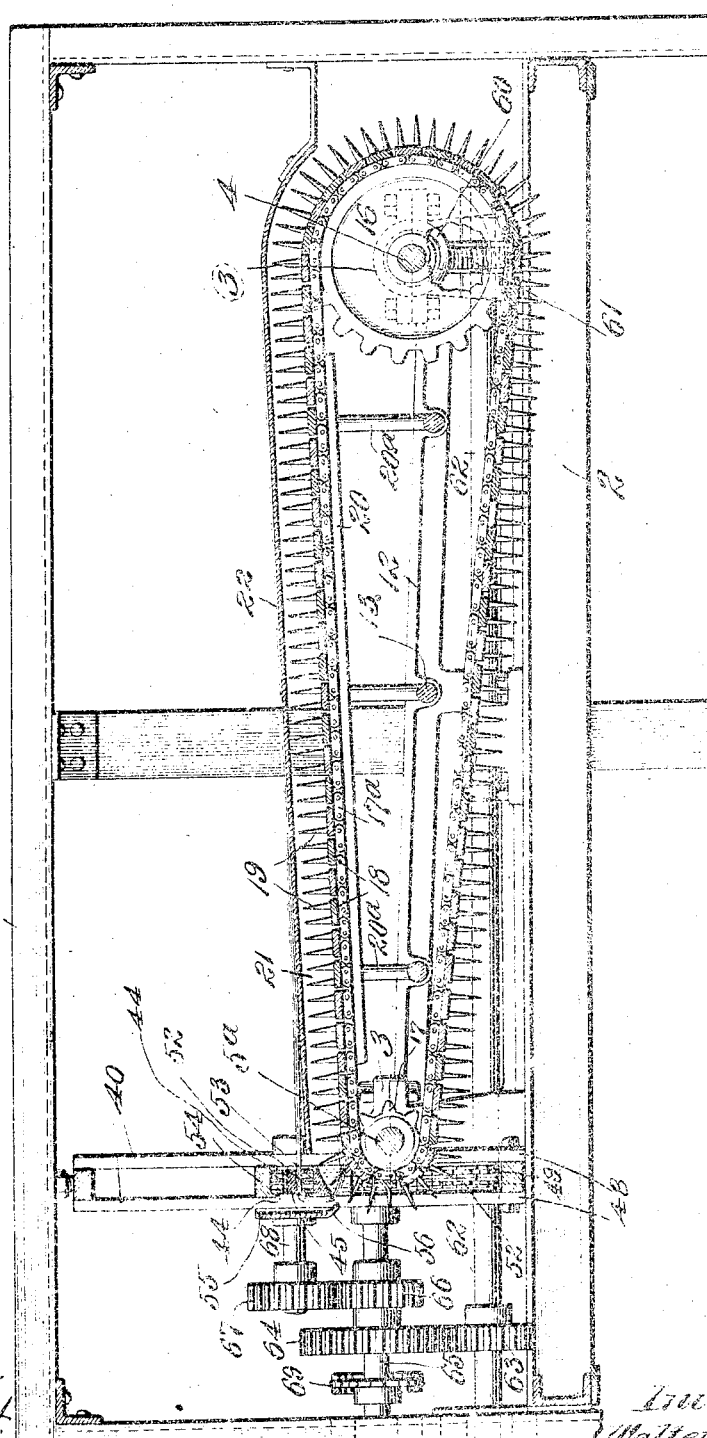

UNITED STATES PATENT OFFICE.

WALTER JOHN HOLLIER, OF ST. LOUIS, MISSOURI.

MACHINE FOR DECORTICATING FIBROUS PLANTS.

1,157,780.

Specification of Letters Patent.  Patented Oct. 26, 1915.

Application filed September 23, 1912.  Serial No. 721,942.

*To all whom it may concern:*

Be it known that I, WALTER JOHN HOLLIER, a British subject, residing in the city of St. Louis and State of Missouri, have invented new and useful Improvements in Machines for Decorticating Fibrous Plants, of which the following is a specification.

This invention relates to a novel machine for separating the fiber from fibrous plants of either the leaf or stalk variety. It is adapted for recovering fiber from plants of the *Aloe* and *Agave* families, from New Zealand and Manila hemp, and from sansevieria, penguin, and the banana stalk; but it is especially designed for use in recovering fiber from plants having long leaves.

In the embodiment of the invention, as illustrated in the accompanying drawings, I aim to provide more particularly for the treatment of the leaf plants, and especially long-leaf plants, as indicated above; but the principle of the invention may be equally well applied to the treatment of all characters of fibrous plants, including, among others of the stalk variety, ramie, hemp, jute, and more particularly flax, necessitating only such changes in form or proportion as may be required by the nature or size of the material to be treated.

In an application for Letters-Patent of the United States filed by me on August 5th, 1912, Serial No. 713,220, I describe and illustrate a machine comprising two revolving cylinders of different size, mounted on the same shaft to rotate in unison, such cylinders being provided with ribs of projecting pins surrounding their circumference, and means for feeding the material lengthwise of these cylinders, and into contact with the pins thereon in such manner that the outer cuticle and waste matter is removed from the fiber from first one portion of the leaf or stalk, and then from the other. A highly important feature of the invention, which is also embodied in the present case, is the fact that the plants are so fed that they are progressively acted upon by the cleaning parts of the larger cylinder from the outer toward the rear or butt end of the leaves or stalks, which operation tends to obviate strain on the fiber and eliminates practically all loss of same. The smaller cylinder is employed for decorticating the portion of the plants previously gripped by, and closely adjacent to the feed carrier of the larger cylinder and which, therefore, cannot be cleaned by said cylinder. In the use of this prior device, I have found that in the decorticating operation, the fiber is drawn around and clings closely to the surface of the cylinder. This is probably due either to the action of centripetal force or to suction. When the fiber extracted is of a coarse, strong variety, this clinging of the fiber to the surface of the cylinder is not objectionable; but in the case of long and fine fiber, I find that there is a tendency of the fiber to hug the cylinder so tightly that some of the fiber is broken occasioning loss.

Largely to overcome this objection, as well as to provide a machine which may be made to readily accommodate the largest sizes of leaves, I have devised the machine forming the subject matter of the present application. This machine comprises generally a large and small endless apron, with means for revolving the same, such aprons being provided with rows of projecting pins, preferably arranged in staggered relation, these two aprons corresponding to the two cylinders of my previous patent, the supporting and driving sprockets of the two aprons being mounted, respectively, on the same shafts. These aprons travel in horizontal planes and there is practically no tendency for the fiber to cling to the surface thereof. By reason of this fact, I am enabled to treat long leaves having fine, delicate fiber, and in such operation the element of waste due to breaking the fibers is practically *nil*.

A further distinguishing feature of this invention is a spiral feed device which operates to aline the butt ends of the stalks against the end of the feed trough, and to convey said stalks between the feed chains which carry them over endless aprons.

In the accompanying drawings, Figure 1 is a plan view of a machine constructed according to my invention, a portion of the guard of the smaller apron being shown broken away; Fig. 2 is a view in rear elevation; Fig. 3 is a sectional view taken on the line 3—3 of Fig. 2, but on an enlarged scale; Fig. 4 is a section, also on an enlarged scale, on the line 4—4 of figure 2; and Fig. 5 is a broken sectional view taken on the line 5—5 of Fig. 3, or the line 5—5 of Fig. 1, the view being designed to illustrate more clearly the manner of supporting the aprons to cause them to travel in a horizontal plane.

Referring now to these drawings, the numeral 1 indicates, generally, the frame of the machine, comprising various vertical and horizontal members, which parts will be referred to, as occasion may require, for the purpose of locating the parts of the machine described.

The machine as a whole is rectangular in shape and extending lengthwise thereof at the sides are girders 2, on which are supported, near opposite ends of the machine, bearings 3, having mounted therein two main shafts, 4, 5, the shaft 4 being the driving shaft and having a driving pulley 4ª mounted thereon. Secured on the shaft 4, at equal distances apart, are four sprocket wheels 6, and secured on the shaft 5 are four similar but smaller sprocket wheels, 7—the two sets of sprocket wheels being in alinement.

The numeral 8 indicates the main decorticating member, which is in the form of an endless apron, and comprises a series of slats 9, secured to four parallel sprocket chains 10, which pass over the respective wheels 6 and 7. Each of the slats 9, is provided with two rows of pins 11, which are arranged in staggered relation, and the two rows of pins of each slat are likewise arranged in staggered relation with the adjacent rows of pins of the two adjoining slats. The bearings 3, at opposite sides of the machine are connected by an integral cross-beam 12, said cross-beams being connected by tie bars 13, three of such bars being shown. Extending upward from each tie bar 13, are four vertical posts 14, the said posts being arranged in line with each other, and supported on the upper ends of these posts are four rails 15, which lie directly under the respective chains 10 and support them, so as to cause the slats carrying the pins to travel in a horizontal plane between the sets of sprocket wheels 6 and 7.

The shaft is continued beyond the frame confining the larger decorticating apron 8, and secured on the extended end thereof are three sprocket wheels 16, somewhat smaller than the sprocket wheels 6. Secured on a shaft 5ª abutting the end of shaft 5, are three sprocket wheels 17, which are considerably smaller than the sprocket wheels 7. Extending over these two sets of sprocket wheels are three sprocket chains 17ª, to which are secured parallel series of slats 18, each of which is provided with two rows of pins 19, arranged in staggered relation in the same manner as described with reference to apron 8. The shafts 17 are supported on rails 20, which are in turn supported by posts 20ª, in the same manner as described with reference to the chains 10. Extending over the entire upper surface of the smaller apron, to which I will refer generally by the numeral 21, is a guard 22, the purpose of which will presently appear.

Mounted between and at the upper end of a pair of bearing plates 23, secured on the front end of the frame, is a double sprocket wheel 24, the bearing of said wheel being indicated at 25 in Fig. 2. Toward the lower end of these plates 23, there is mounted a second double sprocket wheel 26. Toward the rear end of the apron 8, a pair of plates 27 are secured to the frame, and between these plates is mounted a third double sprocket wheel 28, and above it a fourth double sprocket wheel 29. The sprocket wheels 24, 26, 28 and 29 are shown only in dotted lines in Fig. 2. Over the sprocket wheels thus located pass two sprocket chains 30 which travel together as one chain. Above the plates 23, there are secured to the upper part of the frame, at the front end of the machine, two arms 31, between which is mounted a double sprocket wheel 32. Mounted between plates 33, similar to, and extending in line with the plates 27, above the same, is a double sprocket wheel 34, and over the sprocket wheels 32 and 34 pass two sprocket chains 35 which travel together as one chain. The chains 30 and 35 travel in parallel relation for a portion of their distance in an inclined direction, as shown more clearly in Fig. 2, and extending between the arms 31 and plates 33 is a channeled race-way 37, and immediately below it and parallel thereto, a similar race-way 38, chain 35 traveling in the race-way 37, and the chain 30 in the race-way 38, and said race-ways causing the chains to travel in parallel relation and in such close proximity that they will firmly grip material inserted between them. As shown at the right of Fig. 2, these chains slightly diverge at the front end of the machine to provide a feeding space 39 for the insertion of the butt end of the plant which will be gripped by the chains as they pass into the race-ways and carried forward to be acted on by the pins of the apron 8. Supported in the main frame at the rear end of the machine are two vertically disposed parallel plates 40, between which and in suitable bearings is mounted a double sprocket wheel 41, and between similar plates 42, there is mounted a similar sprocket wheel 43, and over the sprocket wheels 41 and 43 is passed a double sprocket chain 44, on the outer side of the links of which are mounted a series of rubber or other elastic blocks 45. Below and in line with the plates 40 are mounted a similar pair of plates 46, between and toward the upper end of which is mounted a double sprocket wheel 47. Beneath the sprocket wheel 43, there is mounted in the upper end of a pair of plates 48, located below and in line with the plates 42, a double sprocket wheel 49. Suitably mounted in bearings below the two sprocket wheels last described, are two idler sprockets 50 and 51, and around the sprockets 47, 29, 50 and 51 are passed two sprocket chains 52. The sprocket chains 52 move for a portion of their length in a plane parallel to a plane traversed by the blocks 45 in a portion of their movement, the chains 52 in such portion of their movement running in and being supported by a race-way 53 and the chain 44 carrying the blocks 45 running in a race-way 54 mounted in the frame in parallel relation with the race-way 53. The race-ways 53 and 54 are positioned such a distance apart that the blocks 45 will run in direct contact with the outer surface of the links of the chain 52, so that these blocks being of a yielding nature will firmly grip the fiber passing between them and the surface of the chain 52, but will have no tendency to crush the fiber.

At the back of the small apron 21, and extending parallel with the surface thereof, there is arranged a plate 55, the lower edge of which curves slightly toward the apron, as indicated at 56, and extends at its forward end a short distance below the lower edge of the race-way 53. From this lowermost point the plate 55 is cut away to provide an inclined portion 57 on its under side at its forward end. The purpose of this plate will appear from the description of the machine to be given later.

Located in front of the race-way 38, from side to side of apron 8 and extending on a backward and downward incline, is a bar 58, provided on its under side at its forward end with an inclined portion 59, the under edge of which bar engages the plant and causes its outer end to be pressed downward toward the apron 8. The incline of this bar causes its rear end to approach close to the race-way 38 whereby said bar will force the portion of the plant adjacent to the butt end downward against the pins of the apron to insure that such portion of the plant shall be acted upon by the decorticating apron.

The machine as a whole is driven from the pulley 4ª, mounted on the shaft 4. The remaining elements of the driving mechanism will now be described.

On the rear end of the shaft 4 is mounted a worm 60 which is in mesh with a worm gear 61 secured on the end of a cross-shaft 62 mounted in suitable bearings in the frame of the machine. Fixedly secured on the cross-shaft 62 is a gear 63, which is in mesh with a larger gear 64 fixedly secured on a cross-shaft 65, which likewise is mounted in suitable bearings in the frame of the machine. Also mounted on the cross-shaft 65 is a gear 66 which is in mesh with a similar gear 67 mounted on a stub shaft 68 having bearings in the lower end of the plates 40. The sprocket wheel 41 is likewise mounted on this stub shaft 68 and through the connection described the sprocket chains 44 are driven. Mounted on the shaft 65 is also a sprocket wheel 69. Mounted on a cross-shaft 70, one end of which is supported in bearings in the upper end of the plates 27 and the other end of which is supported in a bearing 71 on an upright frame member is a sprocket wheel 72, and over the sprocket wheels 69 and 72 is passed a sprocket chain 73 by means of which the shaft 70 is revolved from the shaft 65. Mounted on the shaft 70 is a gear 74, which is in mesh with a similar gear 75 mounted on a stub shaft 76 supported in bearings in the lower end of the plates 33. The double sprocket wheel 34 previously referred to, is mounted on the stub shaft 76, and by the sprocket and gear connection described the sprocket chains 35 are driven. In like manner the double sprocket wheel 29, previously referred to, is mounted on the cross-shaft 70 and through the mechanism described the chains 30 are thereby driven.

The various sprocket chains forming the carriers for the material have been described as traveling in pairs; this construction has been adopted merely for the sake of economy and convenience in construction in accomplishing the object of providing relatively broad gripping surfaces for the plants to be decorticated. I wish it understood, however, that the invention is in no wise limited to the use of double sprocket wheels and pairs of sprocket chains traveling together, but if desired single sprocket chains of sufficient width may be substituted in each instance for the two chains described.

The mechanism for feeding the stalks of the leaves between the feed chains comprises a feed-trough 77, having one side open, and its other side closed by a plate 78. Mounted to rotate in close proximity to the bottom of the feed-trough is a worm 79 which is rotatably mounted in a bracket 80. The inner end of the worm extends beyond the bearing of the bracket 80 in the form of a shaft 81, which is provided with a beveled gear 82, in mesh with beveled gear 83, mounted on a stub shaft 84 supported in bearings in the lower ends of bracket arms 85. Supported in a bracket 86, suitably mounted on the frame, is a shaft 87 on which is secured a sprocket wheel 88, which is in mesh with the sprocket chain 35 on the under side thereof. Secured on the shaft 87 is also a large sprocket gear 89. The stub shaft 84 has a small sprocket wheel 90 mounted thereon and a sprocket chain 91 is passed over the sprockets 89 and 90. Through the mechanism described, the shaft 84 is rotated from the sprocket chain 35 and through the gear connection described the worm 79 will be rotated. The leaves being placed in the trough 77, the rotation of the worm 79 acts to aline the stalks by forcing them against the end plates 78, and at the same time carries them forward and causes them to pass into the space 39 and between the feed chains.

In operation, the butt end of the plants are successively inserted into the space 39 between the chains 30 and 35, which clamp the plants and act as a carrier to convey them over the endless apron 8. The plant passes under the bar 58 which operates to bend the plant downward so that its extreme outer end will be engaged by the pins of the apron 8, and as this apron is rapidly revolved, the plant is progressively decorticated from its outer end inward. In this operation the bars 9 act to knock off thorns or other projections, on the material being cleaned, and to brush the woody particles and the like, from the fiber, thus materially assisting the cleaning operation. Owing to the inclination of the bar 58, the plant is pressed farther and farther downward upon the apron, and by the time the plant has reached the rear end of the bar all but a very small portion of the plant will have been acted upon by the pins of the apron. As clearly shown in Figs. 2 and 4, the chains 44 and 52, constituting the carrier for the secondary or finishing apron 21, travel in a plane considerably in front of the plane traversed by the carrier chains of the main apron. As the decorticated product nears the end of the first carrier, it passes between the blocks 45 and the chain 52 of the second carrier, which latter will therefore clamp the product in the portion which has already been acted upon by the decorticating apron 8. The butt end of the plant now passes from between the chains of the first carrier and in its onward progress it strikes the inclined and curved end of the plate 55, which causes said butt end to be bent downward into the path of the pins of the apron 21, which engage the same and at once bend it under the race-way 53 where it is acted upon by the said pins and by the bars 57 during its progress to the end of the machine. In this latter operation, the part of the plant already decorticated by the main apron rests upon and travels over the guard 22. As the product leaves the second carrier, it may fall upon conveyers which remove it from the machine; or it may be caught and removed by an operator.

As the present machine, with the exception of the endless aprons and the spiral feed device, is in practically all respects identical with the machine described and illustrated in my application above named, I have not thought it necessary to illustrate the means for cutting off the butt end of the plant when such butt end, as is frequently the case, is unsuitable for treatment to recover fiber, or when the fiber thereof is of no commercial value. This construction is included within the claims of my patent aforesaid, and I wish it distinctly understood that I may use the same with the apparatus herein shown. Also I have not herein described the manner of adjusting the supports of the upper carrier chains, as this construction is precisely the same as fully described in my patent aforesaid. I have shown in the present case a spiral feed device which, however, I have used in a somewhat similar relation in a decorticating machine forming the subject matter of various Letters-Patent taken out in this and other countries of the world. In the present machine, however, I provide for alining the butts of the plants by means of the spiral feed, a feature not shown in my previous machine.

I claim:

1. In a machine for decorticating fibrous plants, a traveling member having decorticating pins and moving, as to its operative surface, in a substantially straight line, and means adapted to engage one end of the plant and feed the plant sidewise in a straight downwardly-inclined path over said member from one end to the other thereof and progressively toward and into contact therewith from the outer end of the plant inward.

2. In a machine for decorticating fibrous plants, a traveling member having decorticating pins and moving, as to its operative surface, in a substantially straight line, and means adapted to engage one end of the plant and feed the plant sidewise in a straight downwardly-inclined path over said member from one end to the other thereof in a direction at right angles to its line of travel, and progressively toward and into contact therewith from the outer end of the plant inward.

3. In a machine for decorticating fibrous plants, a pair of endless, traveling aprons arranged to travel in substantially horizontal planes and provided with projecting decorticating members, means for conveying a plant in a straight downwardly-inclined path past the first apron and progressively toward and into contact therewith from the outer end of the plant inward, means for conveying the partly-decorticated plant past the second apron and means for turning the butt end thereof into engagement with the decorticating members of said second apron.

4. In a machine for decorticating fibrous plants, a pair of endless aprons arranged to travel in substantially horizontal planes and provided with decorticating members and supported in endwise relation; means for conveying a plant in a straight, downwardly-inclined path past the first apron, means for causing the main portion of said plant to engage the decorticating members of said apron, conveying mechanism for carrying the partly-decorticated plant past the second apron, and means for turning the butt end of said plant into contact with the decorticating members of the last named apron.

5. In a machine for decorticating fibrous plants, a pair of endless aprons arranged to travel in substantially horizontal planes and provided with projecting pins and supported in endwise relation, means for conveying a plant past the first apron, means for causing the main portion of said plant to engage the pins of said apron progressively from the outer end of the plant inward, conveying mechanism for carrying the partly decorticated plant past the second apron, and means for turning the butt end of said plant into contact with the pins of the last named apron.

6. In a machine for decorticating fibrous plants, a pair of traveling, endless aprons provided with decorticating pins, means for feeding a plant past the first apron and progressively into contact with the pins thereof from the outer end of the plant inward, means for feeding the partly-decorticated plant past the second apron, a guard extending over said second apron for supporting the decorticated portion of the plant in its passage over the apron, and a guide member positioned to engage the butt end of the stalk and to force it into contact with the pins of the second apron.

7. A machine for decorticating fibrous plants comprising a pair of endless, traveling aprons provided with projecting pins, and mounted in endwise relation in different planes to move in unison.

8. A machine for decorticating fibrous plants comprising a pair of endless, traveling aprons moving, as to their operating surfaces in different and substantially horizontal planes, and mounted in endwise relation and having a common driving shaft.

9. In a machine for decorticating fibrous plants, in combination with a decorticating member and feed chains for conveying plants over the same, a feed-trough having an end plate, and a spiral feed-device located in said trough in a position parallel to the feeding chains, and adapted to rotate, as to its lower side, toward said end plate, whereby, in its operation, to aline the butt ends of the plants against the end plate of the trough and simultaneously to carry said ends forward between the feed chains.

In testimony whereof, I have hereunto set my hand in presence of two subscribing witnesses.

WALTER JOHN HOLLIER.

Witnesses:
   HELEN HARRINGTON,
   BRUCE S. ELLIOTT.